United States Patent
Wilson et al.

(10) Patent No.: US 7,482,316 B2
(45) Date of Patent: Jan. 27, 2009

(54) WATER-BASED FLUSHING SOLUTION FOR PAINTS AND OTHER COATINGS

(75) Inventors: Neil R. Wilson, Lake Orion, MI (US); Michael A. Murphy, Jr., Sterling Heights, MI (US)

(73) Assignee: Henkel Kommanditgesellschaft Auf Aktien, Duesseldorf (DE)

( * ) Notice: Subject to any disclaimer, the term of this patent is extended or adjusted under 35 U.S.C. 154(b) by 279 days.

(21) Appl. No.: 10/871,258

(22) Filed: Jun. 18, 2004

(65) Prior Publication Data

US 2004/0259753 A1    Dec. 23, 2004

Related U.S. Application Data

(63) Continuation-in-part of application No. 10/461,515, filed on Jun. 16, 2003, now Pat. No. 7,179,774, and a continuation-in-part of application No. 10/027,445, filed on Dec. 20, 2001, now Pat. No. 6,887,837.

(60) Provisional application No. 60/389,718, filed on Jun. 19, 2002, provisional application No. 60/259,667, filed on Jan. 4, 2001.

(51) Int. Cl.
    *C11D 1/72* (2006.01)
(52) U.S. Cl. .................... 510/201; 510/421; 134/38
(58) Field of Classification Search ................ 510/201, 510/421; 134/38
    See application file for complete search history.

(56) References Cited

U.S. PATENT DOCUMENTS

| | | | | |
|---|---|---|---|---|
| 2,710,843 A | 6/1955 | Stebleton | .................... | 252/158 |
| 2,929,789 A | 3/1960 | Pickett et al. | ................ | 252/153 |
| 2,951,043 A | 8/1960 | Blank | ......................... | 252/171 |
| 2,971,919 A | 2/1961 | Goldsmith | .................... | 252/139 |
| 3,048,547 A | 8/1962 | Vosbigian | .................... | 252/102 |
| 3,553,144 A | 1/1971 | Murphy | ...................... | 252/158 |
| 3,615,827 A | 10/1971 | Murphy | ...................... | 134/38 |
| 3,681,250 A | 8/1972 | Murphy | ...................... | 252/158 |
| 3,847,839 A | 11/1974 | Murphy et al. | .............. | 252/544 |
| 3,954,648 A * | 5/1976 | Belcak et al. | ............... | 510/212 |
| 4,537,705 A | 8/1985 | Mahoney et al. | ............ | 252/529 |
| 4,619,706 A | 10/1986 | Squires et al. | ................. | 134/2 |
| 4,673,524 A | 6/1987 | Dean | ........................... | 252/118 |
| 4,770,713 A | 9/1988 | Ward | ........................... | 134/38 |
| 5,006,279 A | 4/1991 | Grobbel et al. | ............. | 252/542 |
| 5,011,621 A * | 4/1991 | Sullivan | ..................... | 510/211 |
| 5,391,234 A | 2/1995 | Murphy | ....................... | 134/38 |
| 5,411,678 A * | 5/1995 | Sim | ............................. | 510/206 |
| 5,454,985 A | 10/1995 | Harbin | ....................... | 252/558 |
| 5,536,539 A | 7/1996 | Harbin | ....................... | 510/212 |
| 5,591,702 A | 1/1997 | Murphy | ...................... | 252/158 |
| 5,632,822 A | 5/1997 | Knipe, Jr. et al. | ......... | 134/22.12 |
| 5,696,072 A * | 12/1997 | Nercissiantz et al. | ........ | 510/206 |
| 5,701,922 A | 12/1997 | Knipe, Jr. et al. | ......... | 134/100.1 |
| 5,721,204 A | 2/1998 | Maxwell et al. | ............. | 510/206 |
| 5,759,975 A | 6/1998 | Maxwell | ...................... | 510/203 |
| 5,854,190 A | 12/1998 | Knipe, Jr. et al. | ........... | 510/241 |
| 5,958,298 A * | 9/1999 | Nagoshi et al. | ............. | 252/392 |
| 5,972,865 A | 10/1999 | Knipe, Jr. et al. | ........... | 510/212 |
| 5,977,042 A * | 11/1999 | Hernandez et al. | .......... | 510/201 |
| 5,990,062 A | 11/1999 | Summerfield et al. | ....... | 510/204 |
| 6,184,195 B1 * | 2/2001 | Cheung et al. | .............. | 510/432 |
| 6,200,940 B1 | 3/2001 | Vitomir | ...................... | 510/206 |
| 6,303,552 B1 | 10/2001 | Vitomir | ...................... | 510/202 |
| 6,472,027 B1 * | 10/2002 | Olson et al. | .................. | 427/492 |
| 6,544,942 B1 * | 4/2003 | Smith et al. | .................. | 510/417 |
| 6,683,036 B2 * | 1/2004 | Foley et al. | .................. | 510/197 |
| 6,887,837 B2 * | 5/2005 | Wilson | ........................ | 510/212 |
| 2002/0144718 A1 | 10/2002 | Wilson | ........................ | 134/38 |
| 2003/0114327 A1 | 6/2003 | Rehm et al. | ................. | 510/201 |
| 2003/0119688 A1 | 6/2003 | Rehm et al. | ................. | 510/201 |
| 2004/0009884 A1 | 1/2004 | McKay et al. | ............. | 510/203 |

FOREIGN PATENT DOCUMENTS

WO    02/085994 A1    10/2002

* cited by examiner

*Primary Examiner*—Gregory E Webb
(74) *Attorney, Agent, or Firm*—Mary Cameron, Esq.; Woodcock Washburn LLP

(57) ABSTRACT

This invention relates to cleaning compositions for removing paint and other coatings from surfaces and methods of making and using the cleaning compositions.

48 Claims, No Drawings

WATER-BASED FLUSHING SOLUTION FOR PAINTS AND OTHER COATINGS

CROSS-REFERENCE TO RELATED APPLICATIONS

This application is a Continuation-In-Part of U.S. application Ser. No. 10/461,515 filed Jun. 16, 2003 now U.S. Pat. No. 7,179,774 which claims priority to U.S. Provisional Application Ser. No. 60/389,718, filed Jun. 19, 2002, and is a Continuation-In-Part of U.S. application Ser. No. 10/027,445 filed Dec. 20, 2001, now U.S. Pat. No. 6,887,837 which claims priority to U.S. Provisional Application Ser. No. 60/259,667, filed Jan. 4, 2001, each of which is incorporated herein by reference in its entirety.

FIELD

This invention relates to cleaning compositions for removing paint and other coatings from surfaces and methods of making and using the cleaning compositions.

BACKGROUND

Water-based flushing solutions are generally used for cleaning waterborne paints out of automated and manual spraying systems as well as from the external surface of the spraying equipment.

Conventional water-based flushing solutions comprise a component of amines and a component of organic solvent generally selected from the group consisting of simple alcohols and monoethers of glycols, most or all with molecules that contain no more than eight carbon atoms, in order to have sufficient water solubility. The amines used are typically alkanolamines like dimethyl ethanol amine, methyl isopropanol amine, and diethanol amine but are not limited to this class of amines. Typical solvents used in the solution are alcohols and glycol ethers, such as n-butanol, ethylene glycol mono butyl ether, diethylene glycol n-butyl ether, triethylene glycol methyl ether, propylene glycol normal butyl ether, dipropylene glycol methyl ether, propylene glycol methyl ether, and propylene glycol normal propyl ether. Typical concentrate formulas consist of 85 to 99% of solvent and 1 to 15% of alkanolamine, with the balance water. The concentrates are usually diluted to from 5% to 15%, by weight or volume, in deionized water for use as a working water-based paint-removing solution. Operating temperature when using the water-based solution is usually from 21 to 55° C.

Many of the constituents of the conventional water-based flushing solutions are legally classified as "volatile organic compounds", hereinafter usually abbreviated as "VOC". Although these high VOC content paint removing solutions are effective at removing paint, they have the drawback of high VOC emissions that are a source of both indoor and outdoor air pollution and can cause harmful health effects. Lower VOC content paint removing solution, however, have not been as effective at removing paints or other coatings. In particular, low VOC content paint removing solutions have not been effective at removing paints and coatings based on a urethane dispersion resin. Significantly, many of the newer waterborne paints are based on these urethane dispersion systems that are more difficult to solubilize using low VOC based cleaning formulations.

Accordingly, a need exists for flushing or cleaning solutions effective for cleaning paints, including paints based on a urethane dispersion resin, while maintaining low VOC content and/or emissions. A need also exists for flushing solutions that are effective at removing coatings at or near ambient temperatures. The present invention addresses the drawbacks of the prior art and meets the above-identified needs.

SUMMARY

The present invention provides cleaning compositions and methods of cleaning paint and other coating from surfaces. The methods comprise contacting the paint or coating with a composition comprising a water-soluble alkoxylated aromatic alcohol. In some embodiments, the cleaning composition comprises a water-soluble alkoxylated aromatic alcohol having an average of at least one or at least two oxyalkylene moieties per molecule and a polar solvent having a water solubility of less than about 5% by weight in water at 21° C. In other embodiments, the cleaning composition comprises a water-soluble alkoxylated aromatic alcohol having one or two oxyalkylene moieties per molecule and an alkaline source. In preferred embodiments, the water soluble alkoxylated aromatic alcohol has the following formula:

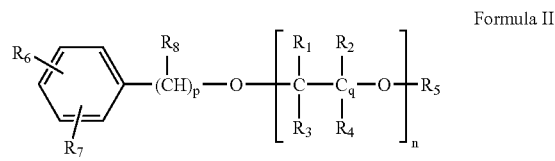

Formula II wherein:
$R_1$, $R_2$, $R_3$ and $R_4$ are independently hydrogen, halogen, or methyl;
$R_5$ is hydrogen;
$R_6$, $R_7$ and $R_8$ are independently hydrogen, $C_{1-4}$ alkyl or halogen;
q is independently 1 or 2 for each of the n moieties,
p is 0 or 1; and
n is from 1 to 10.
In some preferred embodiments, p is 1 or p is 1 and $R_1$, $R_2$, $R_3$, $R_4$, $R_5$, $R_6$, $R_7$, and $R_8$ are hydrogen.

For use in the present invention, the terms cleaning compositions and flushing solutions are used interchangeably.

DETAILED DESCRIPTION OF ILLUSTRATIVE EMBODIMENTS

The present invention provides cleaning compositions and methods for removing paint and other coatings from surfaces using the cleaning compositions.

The present invention relates, in part, to the discovery that a blend of one or more aromatic alcohol alkoxylates and one or more polar solvents having low water solubility is effective as a cleaning solution for solvating, dispersing, or stripping coating systems from surfaces, including equipment used to apply paint or other coatings to surfaces, e.g., automobiles. The aromatic alcohol alkoxylate and polar solvent can be blended together to form a concentrate that is preferably further diluted in water before use. In preferred embodiments, the aromatic alcohol alkoxylate and polar solvent work synergistically to remove paint and other coatings from the application equipment, that is the combination works better than an equal amount of either component.

In preferred embodiments, the aromatic alcohol acts as both an active solvent and a coupling agent for the polar solvent in both the concentrate and diluted form of the cleaning composition. The low water soluble polar solvent improves the dissolving ability of the aromatic alcohol alkoxylate thereby making it more effective at lower usage levels. A low water soluble polar solvent as used herein refers to a compound that is less than about 5% by weight soluble in deionized water at 21° C., preferably less than about 4% by weight soluble in deionized water at 21° C. When a polar solvent, such as n-butanol, that has a solubility greater than 5% by weight was substituted for the polar solvent, the cleaning composition was not as effective. Generally, the cleaning compositions in the dilute form produce a semi-stable dispersion in water with the dispersed phase being made up of the low water soluble polar solvent. Some compositions maintain a homogenous clear appearance possibly due to the low water soluble polar solvent being dissolved in the system as a result of the level and degree of alkoxylation of the aromatic alcohol alkoxylate. Accordingly, the present invention provides cleaning compositions and methods for making cleaning compositions comprising aromatic alcohol alkoxylate and low water soluble polar solvent. In one embodiment, the method comprises mixing an aromatic alcohol alkoxylate with a low water soluble polar solvent thereby forming a blend. Additional excipients can be provided and the composition is preferably further diluted in water before use, as described herein.

The invention also relates, in part, to the discovery that a cleaning composition concentrate comprising greater than about 80%, preferably greater than about 90%, and more preferably about 99% by weight of a water-soluble alkoxylated aromatic alcohol having one or two oxyalkylene moieties per molecule is effective as a cleaning solution. It is desirable that the concentrate contain about 0.1 to about 2% by weight of an alkaline source. Preferably, the composition is diluted in water before use to an alkoxylated aromatic alcohol concentration of about 5 to about 10% by weight and about 0.01 to about 0.2% by weight of an alkaline source. The composition can further include additional auxiliary solvents as described herein. In preferred embodiments, the alkoxylated aromatic alcohol is of Formula II wherein p is 1.

The aromatic alcohol alkoxylates of the present invention comprise at least one oxyalkylene moiety per molecule which is attached to an aromatic ring moiety. In some embodiments, the aromatic ring moiety is attached to the oxyalkylene moiety through an ether oxygen alone or through an oxymethylene (—$CH_2$—O—) moiety. The aromatic alcohol alkoxylates used in the present invention are low Volatile Organic Compound ("VOC") based solvents that typically have a VOC level of less than 50% wt. Preferred cleaning compositions of the present invention have a lbs/gal VOC level of less than 3 lbs/gal. in the concentrate form of the composition.

The alkoxylated aromatic alcohol has in each molecule an aromatic ring moiety which does not bear any alkyl substituent containing more than 4 carbon atoms, and an oxyalkylene moiety. In preferred embodiments, the aromatic alcohol alkoxylate has from about 1 mole to about 10 moles of alkoxylation per mole of the ring moiety. It is desirable that the alkoxylation comprise ethoxylation or propoxylation or combinations of both in each molecule.

The oxyalkylene moiety (also referred to herein as the alkoxylate unit) is preferably represented by the following formula:

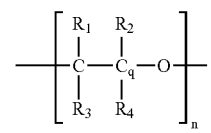

Formula I wherein:
$R_1$, $R_2$, $R_3$ and $R_4$ are independently hydrogen, halogen, or methyl;
n is from 1 to 10, and
q is independently 1 or 2 for each of the n moieties.

In some preferred embodiments of the present invention, the water soluble alkoxylated aromatic alcohol has the following formula:

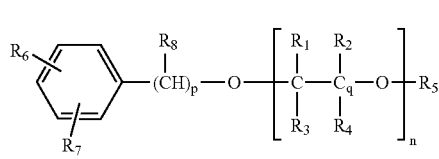

Formula II wherein:
$R_1$, $R_2$, $R_3$ and $R_4$ are independently, halogen, hydrogen or methyl;
$R_5$ is hydrogen;
$R_6$, $R_7$ and $R_8$ are independently hydrogen, halogen, or $C_{1-4}$ alkyl;
q is independently 1 or 2 for each of the n moieties;
p is 0 or 1; and
n is from 1 to 10.

In some preferred embodiments, n is either 1 or 2, from 1 to 10, or from 2 to 10. In other embodiments, n is from 3 to 10, or from 4 to 10. In a particularly preferred embodiment, p is 1.

The cleaning compositions of the present invention can comprise one or more alkoxylated compounds of Formula II wherein "n" represents an average number of alkoxylate units.

In some preferred embodiments,
$R_1$, $R_2$, $R_3$ and $R_4$ are independently hydrogen;
$R_5$ is hydrogen;
$R_6$, $R_7$ and $R_8$ are independently hydrogen;
q is independently 1 or 2 for each of the n moieties;
n is from 1 to 10, and
p is 0 or 1.

In some preferred embodiments, $R_1$, $R_2$, $R_3$ and $R_4$ together are least about 60 atom % hydrogen, more preferably at least 80 atom % hydrogen.

Representative alkoxylated aromatic alcohols include, but are not limited to, ethylene glycol monophenyl ether, diethylene glycol monophenyl ether, triethylene glycol monophenyl ether, tetraethylene glycol monophenyl ether, pentaethylene glycol monophenyl ether, hexaethylene glycol monophenyl ether, heptaethylene glycol monophenyl ether, ethylene glycol monobenzyl ether, diethylene glycol monobenzyl ether, triethylene glycol monobenzyl ether, tetraethylene glycol monobenzyl ether, pentaethylene glycol monobenzyl ether, hexaethylene glycol monobenzyl ether, heptaethylene glycol monobenzyl ether, water-soluble ethoxylates of propylene glycol monophenyl ether and the like and mixtures thereof. Suitable alkoxylated aromatic alcohols are available from commercial sources such as Harcross (T Det P4) and Clariant (ST-8329 and Genapol® BA 010, 020, 030, 040, and 060).

The ring moieties of the alkoxylated aromatic alcohols can be any substituted or unsubstituted aromatic hydrocarbon ring group having 5 to about 50 carbon atoms (unless explicitly specified otherwise) with from about 6 to about 14 atoms being preferred. The ring moiety can be a single ring or multiple condensed rings. Preferred ring moieties include but are not limited to phenyl and naphthyl. The ring moieties can also be substituted or unsubstituted aromatic heterocyclic ring system (monocyclic or bicyclic). Heteroaryl groups can have, for example, from about 3 to about 50 carbon atoms (unless explicitly specified otherwise), with from about 4 about 10 being preferred. Preferred heteroaryl groups include, but are not limited to, 5 to 7-membered mono- or 9- to 10-membered bicyclic heteroaryl rings, which can be saturated or unsaturated, wherein the heteroaryl ring optionally contains from one to four nitrogen heteroatoms. Particularly preferred heteroaryl rings include pyridyl or indolyl rings such as, for example, 2-pyridyl or indo-1-yl.

Any of the positions on the aromatic rings can be unsubstituted or substituted with $C_{1-4}$ alkyl moieties, and at least one of the positions on these rings must be substituted with a moiety that includes a linear moiety as described above. These linear moieties are normally produced by condensing at least one alkylene oxide (e.g., ethylene oxide, propylene oxide) with a suitable compound having at least one active hydrogen (e.g., phenol, benzyl alcohol), as is generally well known in the art. Alkoxylation is preferably carried out under conditions effective to react an average of at least one mole of alkylene oxide per mole of active hydrogen in the aromatic alcohol.

In some embodiments, the cleaning compositions of the present invention comprise an aromatic alcohol alkoxylate as described above (e.g., one or more alkoxylated compounds of Formula II with an average of alkoxylate units of from about 1 to about 10 or from about 2 to about 10) and a low water soluble polar solvent. Any polar solvent having a low water solubility as defined herein can be used in the present methods. Exemplary polar solvents include, but are not limited to, aromatic polar solvents, ethers, ketones, nitro, paraffins, esters, and alcohols that have less than about 5% by weight solubility in deionized water at 21° C. Such solvents include, for example, benzyl alcohol, ethylene glycol phenyl ether (Dowanol EPh), propylene glycol phenyl ether (Dowanol PPh), ethylene glycol butyl ether acetate, propyl glycol butyl ether acetate, propyl acetate, n-butyl acetate, isobutyl acetate, amyl acetate, methyl amyl acetate, DBE, n-butyl propionate, n-pentyl proprionate, ethyl 3-ethoxylproprionate, diethyl ketone, methyl isopropyl ketone, methyl isobutyl ketone, methyl n-amyl ketone, propylene glycol methyl ether acetate, diethyl carbonate, nitromethane, nitroethane, nitrobenzene, nitropropane, and aliphatic alcohols that have 5 or more carbon atoms, such as, for example, n-amyl alcohol, amyl alcohol, methyl amyl alcohol, 2 ethanol hexanol, 2-ethyl 1-butanol, cyclohexanol, n-octyl alcohol, nonyl alcohol, texanol, and decyl alcohol. In some preferred embodiments, the polar solvent is benzyl alcohol, ethylene glycol phenyl ether, or propylene glycol phenyl ether. In a particularly preferred embodiment, the polar solvent is benzyl alcohol. In some embodiments, the cleaning composition will comprise, in addition to the alkoxylated aromatic alcohol and low water soluble polar solvent, an alkaline source, such as for example, an amine.

Exemplary amines include but are not limited to alkanolamines, including, for example primary, secondary or tertiary alkanolamines such as 2-aminopropanol-1 (also known as monoisopropanolamine). Other suitable alkanolamines include, but are not limited to, dimethylethanolamine, diethanolamine, triethanolamine, triisopropanolamine, monoethanolamine, n-butyl diethanolamine, 2-methylaminoethanol, n-butylaminoethanol, diethylaminoethanol, 2-amino-2-methyl-1-propanol, phenyl diethanolamine, diisopropanolamine and the like. Other water-soluble amines such as, for example, alkylamines (e.g., triethylamine) and oxazolidines can also be used.

Generally, the cleaning compositions of the present invention will have equal or greater concentration (i.e., weight percent concentration) of alkoxylated aromatic alcohol as compared to polar solvent having low water solubility. In preferred embodiments, the concentration of alkoxylated aromatic alcohol will be greater than the concentration of polar solvent having low water solubility. A cleaning solution having a greater concentration of alkoxylated aromatic alcohol than polar solvent can be effective at removing coatings from surfaces at lower than expected VOC content. In one example, the alkoxylated aromatic alcohol helps to carry the water and polar solvent into the paint film to swell and break up the coalesced resin thus eliminating the need for large amounts of polar solvent.

In some preferred embodiments, the cleaning compositions of the present invention will have a ratio of from about 1:1 to about 10:1 parts of the alkoxylated aromatic alcohol to parts of polar solvent having low water solubility (preferably there will be a greater concentration of alkoxylated aromatic alcohol than polar solvent in the composition, e.g., from about 1.1:1 to about 10:1, from about 1.2:1 to about 10:1, from about 1.4:1 to about 10:1, from about 1.5:1 to about 10:1, from about 1.6:1 to about 10:1, or from about 1.7:1 to about 10:1 parts of the alkoxylated aromatic alcohol to parts of polar solvent). The ratio of alkoxylated aromatic alcohol to polar solvent can vary depending upon the number of moles of alkoxylation per mole of the ring moiety. For example, in some embodiments, a cleaning composition comprising one or more aromatic alcohols having an average of about 2 moles of alkoxylation per mole of the ring moiety can be most effective at a ratio of from about 8:1 to about 10:1 parts alkoxylated aromatic alcohol to polar solvent having low water solubility. In another embodiment, a cleaning composition comprising one or more aromatic alcohols having an average of about 4 moles of alkoxylation per mole of the ring moiety can be most effective at a ratio of about 1:1 or about 1.1:1 to about 3:1 more preferably, from about 1.2:1 to about 2:1, even more preferably from about 1.5:1 to about 2:1 (e.g., about 1.7:1) parts alkoxylated aromatic alcohol to polar solvent having low water solubility. In another embodiment, a cleaning composition comprising one or more aromatic alcohols having about an average of about 6 moles of alkoxylation per mole of the ring moiety can be most effective at a ratio of from about 2:1 to about 6:1, more preferably from about 4:1 to about 5:1 parts alkoxylated aromatic alcohol to polar solvent having low water solubility.

Some compositions of the present invention contain relatively small amounts of a primary amine, e.g., from about 0.1% to about 3% by weight (not including water). In preferred embodiments, the concentration of primary amine in the cleaning composition is from about at least 0.1, 0.2, 0.3, 0.4, 0.5, 0.6, 0.7, 0.8, 0.9, 1, 1.1, 1.2, 1.3, 1.4., 1.5% by weight but not more than about 3, 2.5, 2, or 1.5, by weight (not including water). Preferred concentrations for amines in the diluted cleaner is from about 1% weight to about 0.01% weight, preferably not less than from about 0.01, 0.02, 0.03, 0.04, 0.05, 0.06, 0.07, 0.08, 0.09, or 0.1% by weight but not more than about 1, 0.5, 0.3, 0.25, 0.2, 0.15% by weight.

The cleaning compositions of the present invention can comprise additional components, such as additional solvents, anionic dispersing or emulsifying agents (e.g., surfactant agents), defoaming agents, corrosion inhibitors and inorganic bases, provided that these additional components do not interfere with the operation of the invention.

Exemplary inorganic bases, include, but are not limited to, alkali metal hydroxides, alkali metal carbonates, alkali metal silicates, alkali metal phosphates, and other basic alkali metal salts.

Exemplary auxiliary solvents include, but are not limited to, $C_{1-4}$ alcohols, propylene glycol ethers, ethylene glycol ether and the like. For example, ethylene glycol n-butyl ether, propylene glycol n-propyl ether, isopropyl alcohol, triethylene glycol monobutyl ether, diethylene glycol n-butyl ether, propylene glycol methyl ether, propylene glycol n-propyl ether, furfuryl alcohol, tetrahydrofurfuryl alcohol, M-Pyrol, n-butyl alcohol, n-propyl alcohol, ethanol, methanol, iso-butyl alcohol, tert-butyl alcohol, sec. butyl alcohol, and acetone.

In some embodiments of the present invention, the cleaning composition comprises one or more water-soluble alkoxylated aromatic alcohol having an average of least one or at least two oxyalkylene moieties per molecule (as described above), a polar solvent having a low water solubility and an auxiliary solvent, such as a $C_{2-4}$ alcohol, e.g., n-propanol. In one preferred embodiment, the cleaning composition comprises a water soluble alkoxylated aromatic alcohol having from 1 to 6 oxyalkylene moieties or from about 2 to 6 as described above (more preferably an average of from 3 to 4 oxyalkylene moieties as described above), benzyl alcohol, and n-propanol alcohol. The cleaning composition can further comprise additional components such as an amine. The present inventors have discovered, for example, that the combination of an alkoxylated aromatic alcohol of the present invention with benzyl alcohol and n-propyl alcohol provides a synergistic effect.

The surfactants used in the present invention can be anionic, non-ionic, cationic or amphoteric in character. Preferably, the surfactant is a low foaming surfactant or is used in combination with a defoamer to minimize the amount of foam generated during use. Examples of suitable surfactants include, but are not limited to, alkylaryl sulfonates such as sodium xylene sulfonate, ethoxylated fatty esters and oils such as MERPOL A (available commercially from E.I. duPont de Nemours & Co.), non-ionic fluorocarbon-based surfactants such as ZONYL FSN (available from E.I. duPont de Nemours & Co.), and non-ionic ethoxylated alkylphenols such as ethoxylated octylphenol. If the water used is very "hard", meaning that it contains substantial concentrations of calcium and/or magnesium cations, a chelating agent for these ions can be used to prevent unwanted precipitation of scums on the surfaces being cleaned. Suitable chelating agents include, but are not limited to, water-soluble compounds containing two or more functional groups such as carboxylic acid groups, phosphoryl groups, amine groups, and/or hydroxyl groups which are arranged in suitable positions in the chelating agent molecule such that atoms in two or more functional groups are capable of complexing with a single calcium and/or magnesium cation. Non-limiting examples of suitable chelating agents include EDTA, gluconic acid, citric acid, polyphosphonic acids, and salts thereof. In some instances for removing especially difficult paints, additional solvent may be needed and may be tolerable even if it increases the VOC content of the composition. The auxiliary solvents are preferably water-soluble and can be selected from, for example, polyalkylene glycols, glycols, glycol ethers, glycol esters, glycol oligomers, aliphatic and aromatic alcohols, ethers, ketones, and the like.

In preferred embodiments, the anionic dispersing or emulsifying agent is a fatty acid, such as palmitic acid, oleic acid, and stearic acid. The corresponding salts of the fatty acids can also be used, including the alkali metal salts, particularly sodium salts. The fatty acid can stabilize non water-soluble solvent in the flushing solution thereby helping to prevent active agents from separating out of the solution. The fatty acids or salts thereof, used in the present invention, preferably have from about 10 to about 24 carbons atoms, more preferably from 12 to 20 carbon atoms and even more preferably from 14 to 20 carbon atoms. The fatty acids can be fully saturated or polyunsaturated. Other preferred surfactants include aliphatic alcohol ethoxylates, such as, for example, Tergitol TMN-6.

Exemplary defoaming agents include, but are not limited to, aliphatic alcohol ethoxylates, such as Tergitol TMN-3.

Exemplary corrosion inhibitors include, but are not limited to, sodium silicate (e.g., grade 40), fatty acids with greater than 10 carbon units, benzotriaozles such as 2-mercaptobenzothiazole, toluoltriazole, benzotriazole, 2(3H)-benzothiazolethion, morpholine, sodium nitrite, sodium benzoate and borates. The corrosion inhibitor can be used to prevent corrosion of aluminum based parts used on the paint or coating applicators.

Formulations of the present invention preferably produce a homogenous one phase concentrate. In some embodiments, the formulations will produce an emulsion system. In a particularly preferred embodiment, the ratio of alkoxylated aromatic alcohol to parts of polar solvent having low water solubility in the cleaning composition is from about 1:1, 1.1:1, or from about 1.5:1 to about 10:1.

In some preferred embodiments, the flushing or cleaning composition in concentrate form comprises from about 10% to 99% by weight of an alkoxylated aromatic alcohol comprising from an average of about 2 to about 10 oxyalkylene moieties per molecule (for example, the alkoxylated aromatic alcohol of formula II wherein there is an average of about 2 to about 10 moles of alkoxylation per mole of aromatic ring), about 5 to about 40% by weight of a polar solvent having a water solubility of less than about 5% by weight in water at about 21° C. (more preferably a water solubility of less than about 4% by weight in water at about 21° C.), about 0.01 to 5% by weight of an alkaline, about 0 to 85% by weight water, about 0 to 2% by weight of a surfactant agent, about 0 to 2% by weight of a defoaming agent, and about 0 to 20% by weight of an auxiliary water soluble solvent. The final composition is preferably diluted to from about 2% to 25% volume in water before use.

In other preferred embodiments, the cleaning composition in concentrate form comprises from about 40% to about 60% by weight of an alkoxylated aromatic alcohol comprising from 2 to 10 oxyalkylene moieties per molecule (preferably from about 2 to 6), about 15 to about 30% by weight of a polar solvent having a water solubility of less than about 4% by weight in water at about 21° C., and further comprising about 0.01 to 1% by weight of an alkaline. The composition is preferably diluted to from about 2% to 25% volume in water before use.

In other preferred embodiments, the cleaning composition in concentrate form comprises from about 40% to about 60% by weight of an alkoxylated aromatic alcohol comprising an average of about 4 oxyalkylene moieties per molecule (for example, the alkoxylated aromatic alcohol of formula II wherein n=4), about 15 to about 30% by weight of a polar solvent having a water solubility of less than about 4% by weight in water at about 21° C., and further comprising about 0.01 to 1% by weight of an alkaline. The composition is preferably diluted to from about 2% to 25% volume in water before use.

In other preferred embodiments, the cleaning composition in concentrate form comprises greater than about 34% weight of an alkoxylated aromatic alcohol comprising from about 2 to 10 oxyalkylene moieties per molecule (preferably from about 2 to 4), and greater than 7% low water soluble polar solvent (e.g., benzyl alcohol or propylene glycol phenyl ether). The composition is preferably diluted to from about 2% to 25% volume in water before use.

In other preferred embodiments, the cleaning composition comprises an alkoxylated aromatic alcohol comprising from about 1 to 10 or from about 2 to about 10 oxyalkylene moieties per molecule as described above (preferably from 2, 3, or 4), n-propanol, and a polar solvent having a low water solubility, preferably benzyl alcohol.

In other preferred embodiments, the cleaning composition in concentrate form comprises about 43% by weight of an alkoxylated aromatic alcohol having an average of 4 oxyalkylene moieties per molecule (e.g., the alkoxylated aromatic alcohol of formula II when p is 1), about 25% by weight of benzyl alcohol, about 0.8% by weight of monoethanolamine, and about 0.2% by weight of surfactant. The composition is preferably diluted to from about 10 to about 12% volume in water before use.

Preferred use concentrations of the disclosed cleaning compositions (e.g., concentrations after dilution in water) comprise from about 1 to about 7% by weight aromatic alkoxylate, and from about 0.4 to about 5% by weight low water soluble polar solvent, more preferably from about 2 to about 7% by weight aromatic alkoxylate and from about 0.7 to about 5% by weight low water soluble polar solvent. The composition can further comprise, for example, from about 0.01 to about 2% of an alkaline source, e.g., alkanolamine. The remainder of the cleaning composition can comprise, for example, water or other auxiliary solvents and/or surfactants. The cleaning compositions of the present invention, after dilution, generally comprise from about 50% to about 99% water, more preferably from about 75% or about 80% or 85% to about 99% water.

The concentration of polar solvent present in the exemplary formulations provided herein typically does not include amounts of polar solvent that may be present as impurities in the alkoxylate aromatic alcohol starting material.

The invention is also directed to methods of using the flushing compositions to remove residual coatings (e.g., anionic and nonionic paints such as, for example, coatings that contain a water-based, nonionic, urethane resin dispersion coating) from surfaces of coating application equipment. Coatings can be removed from a variety of surfaces, e.g., steel, aluminum, or glass, by contacting the surface with a flushing solution of the invention. The cleaning compositions of the present invention can be in concentrate form or diluted form. Generally, it is the diluted form that is for cleaning water-based paints and other coating systems from surfaces. Accordingly, the concentrate is typically diluted in water before use. In methods of the present invention, contact between the solution as described above and any paint or other coating contaminated surface to be cleaned of paint can be brought about by any convenient method. Immersion and spraying are the most common methods. If the surface to be cleaned has a shape that can be readily and reasonably uniformly contacted by spraying, this method of contact is generally preferred, because the mechanical force of impingement of the sprayed solution aids in efficient paint removal. If the surface to be cleaned has recesses or other shapes that can not readily be contacted by spraying, immersion (flooding) will generally be preferred. The solution can be agitated to help accelerate the rate of paint removal. Both methods can, of course be combined and/or varied in ways apparent to those skilled in the art. The optimum values of active ingredient concentrations and temperature of the working solution depend to some extent on the method of contact and the impingement force (if any) achieved by the contact. General guidelines for spraying are given below, but in any instance, those skilled in the art will be able to determine optimum conditions by minimal experimentation.

Optionally, the cleaning compositions may be in dilute form and used in a method comprising the steps of emptying liquid paint from coating application equipment, introducing flushing solution into said equipment, passing the solution over surfaces of the equipment to be cleaned, and withdrawing the solution and dissolved or dispersed paint contained in the solution.

Methods of the present invention include, for example, providing a flushing or cleaning composition according to the present invention (e.g., comprising an aromatic alcohol ethoxylate and a polar solvent, preferably a polar solvent having low solubility), diluting the flushing composition with water to form a diluted flushing solution with about 80% to 98% by weight water, and passing the diluted flushing solution through the coating application equipment to remove the coating from the surfaces of the coating application equipment. Methods of the invention can also be used, for example, to remove coatings that contain, for example an anionic acrylic water reducible resin, wherein the coating contains less acrylic resin than urethane resin by weight or a non-ionic urethane resin dispersion.

Diluted flushing solutions prepared from the cleaning compositions of the invention can be used to remove residual coating from coating application equipment. Removal of the residual coating is required, for example, when the user switches from one color to another, or following use of the equipment. To prepare a diluted flushing solution, the end-user can dilute a concentrated cleaning composition to, for example, about 2% to 50% by volume with water, preferably deionized water. In other embodiments, the flushing composition is diluted to about 2% to about 20% by volume, preferably to about 2% to about 10% by volume, by the addition of water.

Flushing solutions of the invention are also useful for removing paint residues from automated and manual equipment such as paint sprayers and paint dip installations. Typically, the flushing solution is introduced into a purge tank containing an amount of deionized water effective to dilute the flushing solution to about 5% to about 15% by volume. The resulting diluted flushing solution is heated to a temperature of from about 30° C. to about 60° C. and then circulated through the equipment to remove any residual paint from the equipment. However, in practice, the temperature of the circulating flushing solution is often lower than the temperature of the flushing solution in the purge tank due to the consequent heat loss during circulation. Prior to and/or after circulation of the diluted flushing solution, the equipment can be subjected to other cleaning methods such as flushing with water or with a gas such as air or nitrogen. To minimize waste, used diluted flushing solution can be reconditioned (by removing paint solids by means such as filtration, settlement, coagulation or the like) and recirculation through the equipment.

The contact time needed to effect a substantial removal of paint from a surface will depend on the nature and thickness of the paint, the composition of the flushing solution including the dilution factor, the temperature of the solution, and other factors. With some paints and under some conditions, contact times of a few seconds (e.g., 1-5 seconds) or a few minutes (e.g., 2-3 minutes) is sufficient. In some instances, the contact times can be 1 hour or more.

If the flushing solutions are sprayed onto a surface, the spraying pressure will usually range from about 20 pounds per square inch ("psi") to about 160 psi. The temperature of the flushing solution will usually range from, for example, 15° C. to 60° C. (e.g., 15, 20, 21, 25, 30, 40, 50, 54, 55, or 60° C.). Higher temperatures and pressures generally increase the rate at which the paint is removed from the surface.

All publications, patents, and patent applications cited herein are hereby incorporated by reference in their entirety for all purposes. The invention and its benefits will be better understood with reference to the following examples. These examples are intended to illustrate specific embodiments within the overall scope of the invention as claimed, and are not to be understood as limiting the invention in any way.

EXAMPLES

Example 1

Solvency Drop Tests

For the solvency drop tests, test solutions were evaluated at ambient temperatures by applying a specified number of drops of cleaning solution onto a test panel at a rate of 1 drop per second. The test panel was a glass sheet coated with a specified film thickness of test paint, in this instance, BASF Diamond White waterborne paint. The test paint was in a semi-dry state having been previously baked for 30 minutes at 49° C. The glass panels were placed at a 45 degree angle while applying the drops of test solution using a disposable plastic pipette positioned 1 inch above the top edge of the paint film. Observations were made during and at the end of the specified number of drops. This test determines the relative solvency each solution has on a semi-dry film of waterborne paint.

As used herein, "n" represents the average number of moles of alkoxylation per mole of aromatic ring. The aromatic alkoxylate used in the tests is as shown in Formula II wherein p is 1. The percentage is a percentage weight in the concentrate. The concentrate was diluted as shown in the formulation columns before testing. The formulations may contain additional components such as, for example, amines and auxiliary solvents.

The concentration of polar solvent and aromatic alkoxylate in the diluted solution can be calculated by multiplying the dilution percent by volume by the raw material's percent weight in the concentrate.

Preferred aromatic alkoxylates for use in the present invention are of the following formula:

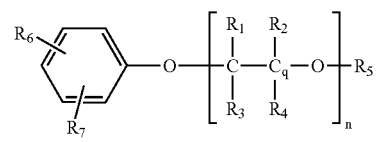

wherein:
$R_1$, $R_2$, $R_3$ and $R_4$ are independently hydrogen, methyl, or halogen;
$R_5$ is hydrogen;
$R_6$, $R_7$ and $R_8$ are independently hydrogen, halogen, or $C_{1-4}$ alkyl;
n is from about 1 to 10, and
q is independently 1 or 2 for each of the n moieties.

Genapol® BA-010, BA-020, BA-030, BA-040, BA-060 were used as the aromatic alkoxylates in the examples section. Genapol® is a product of Clariant and is represented to be an aromatic alcohol alkoxylate wherein the aromatic group is a benzyl ring. The average number of moles of alkoxylation per mole of aromatic ring is represented by "n" and is an average of 1 for Genapol® BA-010, an average of 2 for Genapol® BA-20 and so forth).

TABLE 1

| Formulation Number (at 12% by volume dilution) | Aromatic Alkoxylate % | Polar Solvent % | Number of drops of solvent | Observation | Dissolving |
|---|---|---|---|---|---|
| 1 | 27.7 (n = 3) 11.9 (n = 4) | 18.9 | 50 | Dissolved completely, 100% clean | Yes |
| 2 | 13.9 (n = 2) 25.9 (n = 4) | 15.7 | 50 | Dissolved completely, 100% clean | Yes |
| 3 | 37.1 (n = 4) | 19.3 | 45 | Dissolved completely, 100% clean | Yes |
| 4 | 35 (n = 2) | 7 | 50 | Dissolved completely, 100% clean | Yes |
| 5 | 34.6 (n = 2) 9.6 (n = 4) | 7.2 | 45 | Dissolved with small pieces, 100% clean | Yes |
| 6 | 32.1 (n = 1) 8.3 (n = 4) | NA | 35 | Removed in small pieces, slightly dissolved | No |

TABLE 1-continued

| Formulation Number (at 12% by volume dilution) | Aromatic Alkoxylate % | Polar Solvent % | Number of drops of solvent | Observation | Dissolving |
|---|---|---|---|---|---|
| 7 | 18.2 (n = 1)<br>31.8 (n = 4) | 10.9 | 35 | Dissolved completely, 100% clean | Yes |
| 8 | 42.9 (n = 4) | 23.8 | 30 | Dissolved completely, 100% clean | Yes |
| 9 | 43.4 (n = 4) | 24.94 | 30 | Dissolved completely, 100% clean | Yes |
| 10 | 43 (n = 4) | 25 | 30 | Dissolved completely, 100% clean | Yes |

The solution temperature was 21° C. and the thickness of the paint was 2 mil wet. The Formulation was dropped directly on the paint film.

Table 1 demonstrates that all the formulations tested at room temperature and 12% by volume dilution in DI (deionized) water, except Formula 6, have the ability to dissolve the paint film. Formulations 1-4 and 6 had varying amounts of auxiliary solvent, propylene glycol n-propyl ether. Propylene glycol n-propyl ether at a higher wt % reduced the cleaner's ability to completely dissolve the coating system. Formulation 7 with the aromatic alkoxylate n=1, aromatic alkoxylate n=4 and benzyl alcohol for the polar solvent had good ability to dissolve the paint film using fewer drops. Formulations 8-10 all show complete dissolving of the coating systems using less drops than the other formulations. All formulations are considered low VOC, which is defined as having a lbs/gal VOC level of less than 3 lbs/gal. in the concentrate.

TABLE 2

| Formulation Number | Aromatic Alkoxylate % | Polar Solvent % | Drops of solvent (21° C.) | Observation (21° C.) | Dissolved (21° C.) |
|---|---|---|---|---|---|
| 11 (10% vol) | 32.3 (n = 1)<br>15.6 (n = 6) | NA | 70 | Tore film with large pieces | No |
| 13 (10% vol) | 44 (n = 2) | 2.95 | 60 | Tore film with large pieces, did not dissolve | No |
| 14 (10% vol) | 34.4 (n = 3) | 9.4 | 70 | Tore film with large pieces, did not dissolve | No |
| 15 (10% vol) | 40.8 (n = 2) | 3.3 | 60 | Tore film with large pieces, did not dissolve | No |
| 16 (10% vol) | 30.3 (n = 2)<br>4 (n = 6) | 2.02 | 60 | Tore film with large pieces, did not dissolve | No |
| 17 (10% vol) | 41.2 (n = 4)<br>15.6 (n = 6) | 19.6 | 35 | Dissolved with some small pieces | Yes |
| 18 (10% vol) | 40 (n = 1) | 15 | 38 | Slightly Dissolved, tore in medium size chunks | No |
| 12 (12% vol) | 38.6 (n = 1) | NA | 50 | Slight dissolving, tore in large pieces | No |
| 13 (12% vol) | 44 (n = 2) | 2.95 | 40 | Slight dissolving, tore in large pieces | No |
| 17 (12% vol) | 41.2 (n = 4)<br>15.6 (n = 6) | 19.6 | 33 | Dissolved with some small pieces | Yes |
| 11 (15% vol) | 32.3 (n = 1)<br>15.6 (n = 6) | NA | 50 | Dissolved with some small pieces | Yes |

The thickness of the paint was 2 mil wet. The Formulation was dropped directly on the paint film.

TABLE 3

| Formulation Number | Aromatic Alkoxylate % | Polar Solvent % | Number of drops of solvent (49° C.) | Observation (49° C.) | Good Dissolving (49° C.) |
|---|---|---|---|---|---|
| 11 (10% vol) | 32.3 (n = 1)<br>15.6 (n = 6) | NA | 60 | Slight dissolving, tore in large pieces | No |
| 12 (10% vol) | 38.6 (n = 1) | NA | 29 | Dissolved with some small pieces | Yes |

TABLE 3-continued

| Formulation Number | Aromatic Alkoxylate % | Polar Solvent % | Number of drops of solvent (49° C.) | Observation (49° C.) | Good Dissolving (49° C.) |
|---|---|---|---|---|---|
| 13 (10% vol) | 44 (n = 2) | 2.95 | 33 | Slightly dissolved with small pieces | No |
| 14 (10% vol) | 34.4 (n = 3) | 9.4 | 60 | Dissolved with some small pieces | Yes |
| 16 (10% vol) | 30.3 (n = 2) 4 (n = 6) | 2.02 | 50 | Tore film with large pieces, did not dissolve | No |
| 17 (10% vol) | 41.2 (n = 4) 15.6 (n = 6) | 19.6 | 29 | dissolved | Yes |
| 18 (10% vol) | 40 (n = 1) | 15 | 30 | Dissolved with some small chunks | Yes |
| 12 (12% vol) | 38.6 (n = 1) | | 29 | Dissolved | Yes |
| 13 (12% vol) | 44 (n = 2) | 2.95 | 30 | Dissolved | Yes |
| 17 (12% vol) | 41.2 (n = 4) 15.6 (n = 6) | 19.6 | 20 | Dissolved | Yes |
| 18 (12% vol) | 40 (n = 1) | 15 | 25 | Dissolved | Yes |
| 13 (14% vol) | 44 (n = 2) | 2.95 | 25 | Dissolved | Yes |
| 11 (15% vol) | 32.3 (n = 1) 15.6 (n = 6) | NA | 40 | Dissolved | Yes |

The thickness of the paint was 2 mil wet. The Formulation was dropped directly on the paint film.

Tables 2 and 3 demonstrate the effect that ambient and elevated temperature has on the diluted cleaners' ability to dissolve paint film. Formulation 11 did not contain any added low water soluble polar solvent but contained residual non-reacted benzyl alcohol in the formulation from the manufacturing process. This sample was not effective at 10% volume dilution but did show the ability to dissolve at 15% by volume dilution showing the aggressive solvent action of the aromatic alkoxylate n=1 (Genapol® BA 010) by itself. The 10% or 12% volume of formulations 12-16 and 18 all showed poor ability to dissolve the coating film at room temperature but did show improved dissolving of the paint film at 49° C. Formulations 13 and 16 at 10% volume, had very low benzyl alcohol levels and contained no n=1 aromatic alkoxylate. The 10% volume of formulation 16 contained an auxiliary solvent spike of n-butyl alcohol. The level of spike was not high enough to change the solubility of the cleaning solution at 49° C. Formulation 16 had the lowest level of aromatic ethoxylate coupling/active solvent agent.

TABLE 4

| Formulation Number | Aromatic Alkoxylate % | Polar Solvent % | Drops of solvent (21° C.) | Observation (21° C.) | Dissolved (21° C.) |
|---|---|---|---|---|---|
| 21 (10% vol) | 40 (n = 3) | 20 | 30 | Dissolved | Yes |
| 19 (10% vol) | 43.7 (n = 3) | 15.9 | 28 | Dissolved with some small pieces | Yes |
| 14 (10% vol) | 34.4 (n = 3) | 9.4 | 70 | Tore film with large pieces, did not dissolve | No |
| 18 (10% vol) | 40.0 (n = 3) | 15 | 38 | Slightly dissolved, tore in medium size chunks | No |
| 20 (12% vol) | 27.7 (n = 3) 11.9 (n = 4) | 18.9 | 50 | Dissolved Completely, 100% clean | Yes |

The thickness of the paint was 2 mil wet. The Formulation was dropped directly on the paint film.

Table 4 shows the effect of varying the amount of polar solvent with aromatic alkoxylate n=3 (Genapol® BA 030) based formulation. As the level of polar solvent decreases below 1.59% wt in the diluted cleaner, the ability to dissolve the paint film decreases.

TABLE 5

| Formulation Number | Aromatic Alkoxyalte % | Polar Solvent % | Number of drops of solvent (21° C.) | Observation (21° C.) | Dissolved (21° C.) |
|---|---|---|---|---|---|
| 24 (10% vol) | 42.5 (n = 2) | 3.2 | 64 | Tore film in large pieces, did not dissolve | No |
| 16 (10% vol) | 30.3 (n = 2)<br>4 (n = 6) | 2.02 | 60 | Tore film with large pieces, did not dissolve | No |
| 13 (10% vol) | 44 (n = 2) | 2.95 | 60 | Tore film with large pieces, did not dissolve | No |
| 21A (10% vol) | 39.1 (n = 2) | 9.3 | 50 | Tore film, Medium size chunks, Slight Dissolving, 100% clean | No |
| 27 (10% vol) | 40.5 (n = 2) | 10.10 | 30 | Slightly more dissolving with small pieces | Yes |
| 26 (10% vol) | 26.87 (n = 2) | 13.4 | 30 | Slightly dissolved with small pieces | No |
| 25 (10% vol) | 18.5 (n = 2)<br>18.3 (n = 6) | 14.9 | 28 | Slightly dissolved with some small pieces | No |
| 22 (10% vol) | 40 (n = 2) | 15 | 30 | Dissolved paint film with some small chunks, 100% clean | Yes |
| 23 (10% vol) | 40 (n = 2) | 20 | 25 | Dissolved paint film completely, 100% clean | Yes |
| 13 (12% vol) | 44 (n = 2) | 2.95 | 40 | Slightly dissolving, tore in large pieces | No |
| 28 (12% vol) | 35 (n = 2) | 7 | 50 | Dissolved completely, 100% clean | Yes |
| 29 (12% vol) | 34.6 (n = 2)<br>9.6 (n = 4) | 7.2 | 45 | Dissolved with some small pieces, 100% clean | Yes |

The thickness of the paint was 2 mil wet. The Formulation was dropped directly on the paint film.

TABLE 6

| Formulation Number | Aromatic Alkoxylate % | Polar solvent % | Number of drops of solvent (49° C.) | Observation (49° C.) | Good Dissolving (49° C.) |
|---|---|---|---|---|---|
| 16 (10% vol) | 30.3 (n = 2) 4 (n = 6) | 2.02 | 50 | Tore film with large pieces, did not dissolve | No |
| 13 (10% vol) | 44 (n = 2) | 2.95 | 33 | Slightly dissolved with small pieces | No |
| 13 (12% vol) | 44 (n = 2) | 2.95 | 30 | Dissolved | Yes |
| 13 (14% vol) | 44 (n = 2) | 2.95 | 25 | Dissolved | Yes |

The thickness of the paint was 2 mil wet. The Formulation was dropped directly on the paint film.

Tables 5 and 6 demonstrate the effects of formulations based on aromatic alkoxylate n=2 (e.g., Genapol® BA 020) and polar solvent (e.g., benzyl alcohol or Dowanol PPh). Formulations with greater than 34% wt aromatic alkoxylate n=2 and greater than 7% polar solvent had good ability to dissolve the paint film at room temperature. Formulation 25 had a low water soluble polar solvent concentration of 14.9% wt Dowanol PPh. The performance drop is most likely due to the low level of Genapol® BA 020 (a more aggressive solvent on the paint) and the higher level of aromatic alkoxylate n=6 (better coupling ability but less aggressive solubility towards the paint film). The end results of the 10% dilution was a coupled homogenous solution with no dispersed phase present. At higher concentration levels, this formulation produces a dispersed solvent phase with improved dissolving ability. Due to the improved solvency of aromatic alkoxylate n=2, lower levels of low water soluble polar solvents are needed to achieve the desired solubility compared to the aromatic alkoxylate n=3, 4, and 6 formulations. Formulation 21A contains triethylene glycol monobutyl ether which has poor solvency properties towards the paint film.

TABLE 7

| Formulation Number | Aromatic Alkoxylate % | Polar Solvent % | Number of drops of solvent | Observation | Good Dissolving |
|---|---|---|---|---|---|
| 30 (7% volume) | 42.8 (n = 4) | 28.5 | 32 | Tore film, large size chunks, Slight dissolving, 100% clean | No |
| 30 (8.5% volume) | 42.8 (n = 4) | 28.5 | 30 | Dissolved paint with some small chunks, 100% clean | Yes |
| 30 (10% volume) | 42.8 (n = 4) | 28.5 | 25 | Dissolved completely, 100% clean | Yes |

The thickness of the paint was 2 mil wet and the solution temperature was 21° C. The Formulation was dropped directly on the paint film.

Table 7 demonstrates that the performance of the cleaner drops as the concentration of the test solution decreases. As the level of polar solvent (e.g., benzyl alcohol) in the diluted concentrate drops to 2% wt or below, the ability of the solution to dissolve the paint decreases. The level of aromatic alkoxylate n=4 (e.g.,Genapol® BA 040) does impact the dispersion phase due to the coupling ability of the aromatic alkoxylate product. However, the level of aromatic alkoxylate n=4 also impacts the performance of the product. As the level of aromatic alkoxylate n=4 drops to 3% and below, the ability of the cleaner to dissolve the paint film decreases thereby demonstrating a synergistic property between the polar solvent and aromatic alkoxylate coupling agent.

The thickness of the paint was 4 mil wet (formulation 31 was tested at a thickness of 2 mil wet) and the solution temperature was 21° C. The Formulation was dropped directly on the paint film.

Table 9 demonstrates the performance of blends spiked with additional VOC containing auxiliary solvents. Formula 37 diluted at 10% volume produced a coupled homogenous system. This formula has a high level of n-butyl alcohol with a low level of polar solvent (e.g., benzyl alcohol). Formula 34 has a high level of polar solvent (e.g., benzyl alcohol), a high level of sec. butyl alcohol and a lower level of aromatic alkoxylate n=4 resulting in a high % wt VOC formulation. This formula did not perform well due to the low level of aromatic alkoxylate. When additional aromatic alkoxylate

TABLE 8

| Formulation Number | Aromatic Alkoxylate % | Polar Solvent % | Number of drops of solvent | Observation | Good Dissolving |
|---|---|---|---|---|---|
| 44 (10%) | 32.8 (n = 4) | 16.2 | 28 | Slightly dissolved with some small pieces, 100% clean | No |
| 45 (10%) | 34.2 (n = 4) | 17.9 | 28 | Slightly dissolved with some small pieces, 100% clean | No |
| 17 (10%) | 41.2 (n = 4) | 19.6 | 35 | Dissolved with some small pieces, 100% clean | Yes |
| 43 (10%) | 38.4 (n = 4) | 22.2 | 28 | Dissolved with some small pieces, 100% clean | Yes |
| 10 (12%) | 43 (n = 4) | 25 | 30 | Completely dissolved, 100% clean | Yes |
| 33 (10%) | 40.9 (n = 4) | 30 | 25 | Dissolved Film | Yes |

The thickness of the paint was 2 mil wet and the solution temperature was 21° C. The Formulation was dropped directly on the paint film.

Table 8 demonstrates the performance of various formulations based on different amounts of polar solvents having a water solubility of less than 4%. As the level of polar solvent drops below 1.9% weight and the level of aromatic ethoxylate drops below 4% weight, the ability of the solution to dissolve the paint decreases.

was added, as shown in formula 35, the diluted solution had a good ability to dissolve the paint film. Formula 31 contains a low VOC couple solvent triethylene glycol monobutyl ether with a relative high level of polar solvent. This formula had no effect on the paint film. This is most likely due to a combination of poor solvency properties of the triethylene glycol mono butyl ether, low level of aromatic alkoxylate n=4 and the high coupling efficiency of the triethylene glycol mono butyl ether in the dilute phase.

TABLE 9

| Formulation Number | Aromatic Alkoxylate % | Polar Solvent % | Number of drops of solvent | Observation | Good Dissolving |
|---|---|---|---|---|---|
| 37 (10% vol) | 15 (n = 4) | 5 | 70 | Tore in large chunks, Slight dissolving, 90% removal | No |
| 34 (10% vol) | 15.8 (n = 4) | 29.7 | 63 | Tore film small size chunks, slight dissolving 70% clean | No |
| 35 (10% vol) | 5 (n = 2) 15 (n = 4) | 30 | 51 | Dissolved film with some small chunks, 100% clean | Yes |
| 36 (10% vol) | 20 (n = 4) | 26 | 49 | Dissolved film with some small chunks, 100% clean | Yes |
| 31 (10% vol) | 21.9 (n = 4) | 17.6 | 25 | No effect | No |

TABLE 10

| Formulation Number | Aromatic Alkoxylate % | Polar Solvent % | Number of drops of solvent | Observation | Good Dissolving |
|---|---|---|---|---|---|
| 56 (10% vol) | 32.2 (n = 6) | 19.4 | 30 | Slightly dissolved with some small pieces | No |
| 57 (10% vol) | 32.77 (n = 6) | 22.4 | 30 | Slightly dissolved with some small pieces | No |
| 58 (10% vol) | 34.9 (n = 6) | 25.2 | 29 | Dissolved with some small pieces | Yes |
| 55 (10% vol) | 35.5 (n = 6) | 25.1 | 25 | Dissolved | Yes |

The thickness of the paint was 2 mil wet and the solution temperature was 21° C. The Formulation was dropped directly on the paint film.

Table 10 demonstrates that the cleaners have good dissolving ability at the 2.5% weight range but start to loose the ability to dissolve paint at 2.24% weight polar solvent and below. As the ethoxylation level increases in the aromatic ethoxylate coupling/active solvent, its solubility properties decrease and the coupling ability increases.

Table 11 shows the effects of formulations with various amounts of benzyl alcohol or Dowanol PPh. The data indicates a drop in performance when the level of benzyl alcohol drops to a 2.27% wt in the 10% volume diluted solutions and 2.46% wt for Dowanol PPh in the 10% volume diluted solutions. Optimal performance for these formulas are achieved when the low water soluble polar solvents are at or above

TABLE 11

| Formulation Number | Aromatic Alkoxylate % | Polar Solvent % | Number of drops of solvent | Observation | Good Dissolving |
|---|---|---|---|---|---|
| 51 (10% vol) | 35.4 (n = 6) | 22.7 (Benzyl Alcohol) | 70 | Slightly dissolved with medium pieces | No |
| 49 (10% vol) | 39.4 (n = 6) | 26.9 (Benzyl Alcohol) | 63 | Small chunks slight to medium dissolving, 100% clean | Yes |
| 50 (10% vol) | 31.4 (n = 6) | 28.4 (Benzyl Alcohol) | 51 | Dissolved film with some small chunks, 100% clean | Yes |
| 52 (10% vol) | 24.8 (n = 6) | 16.9 (Dowanol PPH) | 49 | Tore film in medium pieces, did not dissolve | No |
| 53 (10% vol) | 28 (n = 6) | 22.7 (Dowanol PPH) | 25 | Slightly dissolved with small pieces | No |
| 54 (10% vol) | 31.65 (n = 6) | 24.6 (Dowanol PPH) | 28 | Slightly dissolved with some small pieces | No |

The thickness of the paint was 2 mil wet and the solution temperature was 21° C. The Formulation was dropped directly on the paint film.

2.4% wt in the dilute form. As the ethoxylation level increases in the aromatic ethoxylate coupling/active solvent, its solubility properties decrease and the coupling ability increases.

TABLE 12A

| Formulation Number | n-butanol | Isopropyl alcohol | Propylene glycol methyl ether | Benzyl alcohol | MEA | Triton X-100 | Oleic acid | Water |
|---|---|---|---|---|---|---|---|---|
| 58A | | | | 10 | .3 | | .15 | 89.55 |
| 59 | | 10 | | 10 | .1 | | | 79.9 |
| 60 | | | | 5 | .31 | | .28 | 94.41 |
| 61 | | | | 5 | .1 | .3 | | 94.6 |
| 62 | 3 | | | 5 | .1 | .4 | | 91.5 |
| 63 | | | 9.9 | | .1 | | | 90 |

TABLE 12B

| Formulation Number | Number of drops of solvent | Mil wet | Observation | Good Dissolving |
|---|---|---|---|---|
| 58A | 50 | 4 | Swelled film, did not break film into chunks, no signs of dissolving | No |
| 59 | 50 | 4 | Swelled film, did not break film into chunks, no signs of dissolving | No |
| 60 | 50 | 4 | Very little effect | No |
| 60 | 25 | 2 | Very little effect | No |
| 59 | 50 | 4 | Swelled film, did not break film into chunks, no signs of dissolving | No |
| 61 | 25 | 2 | 20 drops before film started chunking off, no dissolving, 10% | No |

TABLE 12B-continued

| Formulation Number | Number of drops of solvent | Mil wet | Observation | Good Dissolving |
|---|---|---|---|---|
| 62 | 25 | 2 | 20 drops before film started chunking off, no dissolving, 30% | No |
| 63 | 25 | 2 | Did not dissolve, 0% removal | No |

The thickness of the paint was 2 or 4 mil wet and the solution temperature was 21° C. The Formulation was dropped directly on the paint film Tables 12A and 12B demonstrate that various cleaning solutions that do not contain aromatic alcohol alkoxylate did not dissolve the paint film.

TABLE 13A

| Formulation Number | B | A n = 2 | PGME | Sec-butyl alcohol | BA | MEA | Oleic acid | Triethylene glycol monobutyl ether | TMN-3 | TMN6 | A n = 4 | W |
|---|---|---|---|---|---|---|---|---|---|---|---|---|
| 69 | 50 | | | | 15 | 1 | | 12.5 | | | | 21.5 |
| 70 | 40 | | | | 20 | 1 | | 10 | | | | 29 |
| 71 | 70 | | | | | | 1 | | | | | 29 |
| 72 | 40 | | | | | | 1 | 30 | | | | 29 |
| 73 | | | | | 40 | 1 | | 30 | | | | 29 |
| 74 | | | | | | | 1 | 70 | | | | 29 |
| 75 | 27.9 | | | | 9.3 | 1 | | 24.7 | | | | 37.1 |
| 76 | 30 | | | | 20 | 1 | | 20 | | | | 29 |
| 77 | 39.5 | | | | 19.5 | 1 | | 17.1 | .2 | .4 | | 22.3 |
| 78 | | | | 30 | 29.7 | 1 | | | | | 15.8 | 23.5 |
| 79 | | 5 | | 30 | 30 | 1 | | | | | 15 | 19 |
| 80 | 15 | | | | 15 | 26 | 1 | | | .4 | 20 | 22.6 |
| 81 | | | 25 | | 33.3 | 1 | .005 | | | | | 40.69 |

B is n-butanol, PGME is propylene glycol methyl ether, BA is benzyl alcohol, W is deionized water, A is aromatic alkoxylate.

TABLE 13B

| Formulation Number (10% vol.) | Aromatic Ethoxylate % | Polar Solvent | Number of drops of solvent | Mil wet | Observation | Good Dissolving |
|---|---|---|---|---|---|---|
| 81 | NA | 33.3 | 30 | 2 | Tore film, large size chunks, no dissolving 100% clean | No |
| 79 | 5 (n = 2) | 30 | 51 | 4 | Dissolved film with some small chunks 100% removal | Yes |
| 80 | 20 (n = 4) | 26 | 49 | 4 | Dissolved film with some small chunks 100% removal | Yes |
| 78 | 15.8 (n = 4) | 29.7 | 63 | 4 | Tore film, small size chunks, slight dissolving 70% clean | No |
| 77 | NA | 19.5 | 50 | 4 | Tore film, medium size chunks, slight dissolving 100% clean | No |
| 75 | NA | 9.3 | 40 | 2 | Tore in big chunks, no dissolving 100% removal | No |

TABLE 13B-continued

| Formulation Number (10% vol.) | Aromatic Ethoxylate % | Polar Solvent | Number of drops of solvent | Mil wet | Observation | Good Dissolving |
|---|---|---|---|---|---|---|
| 76 | NA | 20 | 46 | 2 | Tore film, medium size chunks, slight dissolving 100% clean | No |
| 73 | NA | 40 | 80 | 4 | Tore film, small size chunks, slight dissolving 100% clean | No |
| 70 | NA | 20 | 55 | 4 | Tore film, small size chunks, slight dissolving 100% clean | No |
| 71 | NA | NA | 60 | 4 | Tore in big chunks, slight dissolving 100% removal | No |
| 70 | NA | 20 | 25 | 2 | Tore film, small size chunks, slight dissolving 100% clean | No |
| 69 | NA | 15 | 20 | 2 | Tore film, small size chunks, slight dissolving 100% clean | No |
| 68 | NA | 9.1 | 20 | 2 | Tore film, large size chunks, slight dissolving 100% clean | No |
| 67 | NA | 9.1 | 25 | 2 | No effect | No |
| 65 | NA | 10 | 20 | 2 | No effect | No |
| 66 | NA | 10 | 20 | 2 | No effect | No |
| 64 | NA |  | 20 | 2 | No effect | No |

The solution temperature was 21° C. The Formulation was dropped directly on the paint film.

Tables 13A and 13B demonstrate the dissolving abilities of various cleaning solutions with and without low water soluble polar solvent and auxiliary solvents. All of these formulations except 79 and 80 were unable to completely dissolve the paint film. Formulation 79 and 80 contained various amounts of VOC containing solvents n-butanol and sec-butyl alcohol in combination with aromatic alkoxylates and polar solvent. Formulation 73 used triethylene glycol mono-butyl ether as a coupling agent with a high level of polar solvent. Formulation 73 did not produce a cleaning solution that completely dissolved the paint film at 21° C. Other formulations based on triethylene glycol mono-butyl ether did not produce cleaning solutions in the dilute form that had the ability to completely dissolve the paint film.

TABLE 14

| Formulation Number (12% vol.) | Aromatic Alkoxylate % | Polar Solvent | Number of drops of solvent | Mil wet | Observation | Good Dissolving |
|---|---|---|---|---|---|---|
| 98 | 42 (n = 4) | 30 (n-amyl alcohol) | 34 | 2 | Dissolved completely, 100% clean | Yes |
| 99 | 42 (n = 4) | 30 (methyl n-amyl ketone) | 30 | 2 | Removed the paint in large pieces, no dissolving | No |
| 100 | 49.7 (n = 4) | NA | 60 | 2 | No effect, 0% removal | No |
| 101 | 50 (n = 2) | 10 (n-amyl alcohol) | 30 | 2 | Dissolved completely, 100% clean | Yes |
| 102 | 40 (n = 3) | 20 (n-amyl alcohol) | 30 | 2 | Dissolved completely, 100% clean | Yes |

The solution temperature was 21° C. The Formulation was dropped directly on the paint film.

Table 14 evaluates the effects of low water soluble polar solvents methyl n-amyl ketone and n-amyl alcohol. The data shows good dissolving ability using n-amyl alcohol. The methyl n-amyl ketone showed poor dissolving ability but did remove the paint film after 30 drops.

The solution temperature was 21° C. The Formulation was dropped directly on the paint film.

Table 16 lists formulations based on aromatic alkoxylate n=1 and n=2 at high concentration levels. Both of these samples do have residual un-reacted benzyl alcohol (the aromatic alkoxylate of formulation 103 is Genapol® BA 010 which has about 16.8% unreacted benzyl alcohol and the aromatic alkoxylate of formulation 104 is Genapol® BA 020

TABLE 15

| Formulation Number | Aromatic Ethoxyylate % | Polar Solvent % | n-proponal | Number of drops of solvent | Mil wet | Observation | Good Dissolving |
|---|---|---|---|---|---|---|---|
| 93 | 5 (n = 2) | 1 | | 25 | 2 | Plume area 30% clean, dissolved in big pieces | Yes |
| 86 | 4.9 (n = 2) | | | 25 | 2 | Small chunks, cracked and dissolved | Yes |
| 97 | 5 (n = 2) | 1 | 1 | 25 | 2 | Plume area 80% clean, dissolved in small pieces | Yes |
| 93 | 5 (n = 2) | 1 | | 50 | 4 | Plume area 30% clean, dissolved in big pieces | Yes |
| 86 | 4.9 (n = 2) | | | 50 | 4 | Small chunks, signs of dissolving after 40 drops | Yes |
| 97 | 5 (n = 2) | 1 | 1 | 50 | 4 | Plume area 40% clean, dissolved in big pieces | Yes |

Table 15 evaluates the combinations of benzyl alcohol ethoxylated to n=2, n-propanol, and benzyl alcohol. The combination of all 3 components in the formulation improved the cleaning performance thereby demonstrating a synergistic advantage. For this table, the percentage is a percentage weight in the diluted solution.

which has about 5.9% unreacted benzyl alcohol). Test results demonstrate that formulation 103 has good ability to dissolve the paint film at 5% by volume and 10% by volume dilutions. Formulation 104 which has less un-reacted benzyl alcohol, shows good ability to dissolve the paint film at 10% by volume dilution.

TABLE 16

| Formulation Number | Aromatic Alkoxylate % | Polar Solvent % | Number of drops of solvent | Mil wet | Observation | Good Dissolving |
|---|---|---|---|---|---|---|
| 103 (10% volume) | 99 (n = 1) | NA | 40 | 2 | Dissolved completely, 100% clean | Yes |
| 103 (5% volume) | 99 (n = 1) | NA | 36 | 2 | Dissolved completely, 100% clean | Yes |
| 103 (4% volume) | 99 (n = 1) | NA | 40 | 2 | Broke film into large pieces, slightly dissolved | No |
| 104 (10% volume) | 99 (n = 2) | NA | 40 | 2 | Dissolved completely, 100% clean | Yes |
| 104 (5% volume) | 99 (n = 2) | NA | 60 | 2 | Did not dissolve | No |

Example 2

Dry Film Removal Test

For the spray removal test, test solutions were evaluated by the time and temperature required to clean a 10.4 mm diameter circle of paint at a constant psi. Test solutions were evaluated at ambient temperatures by spraying, at a constant psi, a solid stream of fluid from a spray gun at a test panel. The test panel was a glass sheet coating with a specified film thickness of test paint, in this instance, BASF Diamond White waterborne paint. The test paint was in a semi-dry state having been previously baked for 30 minutes at 49° C.

In the table presented below, "n" represents the average number of moles of alkoxylation per mole of aromatic ring. The aromatic alkoxylate used in the tests is as shown in Formula II wherein p is 1. The percentage is a percentage weight in the concentrate. The concentrate was diluted as shown in the formulation columns before testing. The formulations may contain additional components such as, for example, amines and auxiliary solvents.

The concentration of polar solvent and aromatic alkoxylate in the diluted solution can be calculated by multiplying the dilution percent by volume by the raw material's percent weight in the concentrate

TABLE 17

| Formulation Number | Aromatic alkoxylate % | Polar Solvent % | n-propanol | Average removal time | Temperature | Mil wet | Observation |
|---|---|---|---|---|---|---|---|
| 86 | 4.9 (n = 2) | | | 4.74 | 38° C. | 4 | Lifted paint film and then dissolved quickly |
| 93 | 5 (n = 2) | 1 | | 4.15 | 38° C. | 4 | Lifted and dissolved the paint simultaneously |
| 97 | 5 (n = 2) | 1 | 1 | 3.29 | 38° C. | 4 | Lifted and dissolved the paint simultaneously |
| 86 | 4.9 (n = 2) | | | 5.41 | 23° C. | 4 | Did not dissolve the film, generated a hole then lifted the film. |
| 93 | 5 (n = 2) | 1 | | 5.34 | 23° C. | 4 | Paint lifted and then started to dissolve |
| 97 | 5 (n = 2) | 1 | 1 | 4.99 | 23° C. | 4 | Paint lifted and then started to dissolve quickly. |

This table demonstrates that the combination of n-propyl alcohol and benzyl alcohol showed a synergistic effect.

The invention has been described with reference to various specific and preferred embodiments and techniques. Alternatives and variations of the examples are within the scope of the present invention and can be carried out by a person skilled in the art. Ingredients may be exchanged for equivalent ingredients. It should be understood that many variations and modifications might be made while remaining within the spirit and scope of the invention.

What is claimed:

1. A composition comprising:
   (i) a water-soluble alkoxylated aromatic alcohol having at least two oxyalkylene moieties per molecule and an aromatic ring moiety in each molecule which does not bear any alkyl substituent having more than 4 carbon atoms; and
   (ii) a polar solvent having a water solubility of less than about 5% by weight in water at 21° C., wherein the weight percent concentration of the alkoxylated aromatic alcohol in composition is equal to or greater than the weight percent concentration of the polar solvent.

2. The composition of claim 1 wherein said polar solvent has a water solubility of less than about 4% by weight in water at 21° C.

3. The composition of claim 1 wherein the weight percent concentration of alkoxylated aromatic alcohol in the composition is greater than the weight percent concentration of polar solvent.

4. The composition of claim 1 wherein the ratio of alkoxylated aromatic alcohol to polar solvent is from about 1:1 to about 10:1.

5. The composition of claim 1 wherein the ratio of alkoxylated aromatic alcohol to polar solvent is from about 1.1:1 to about 10:1.

6. The composition of claim 1 wherein the ratio of alkoxylated aromatic alcohol to polar solvent is from about 1.7:1 to about 2:1.

7. The composition of claim 1 wherein the polar solvent is at least one of an aromatic polar solvent or an aliphatic polar solvent.

8. The composition of claim 7 wherein the aromatic polar solvent is at least one of benzyl alcohol, ethylene glycol phenyl ether, or propylene glycol phenyl ether.

9. The composition of claim 7 wherein the aliphatic polar solvent is an aliphatic alcohol having 5 or more carbon atoms.

10. The composition of claim 9 wherein the aliphatic alcohol is at least one of n-amyl alcohol, amyl alcohol, methyl amyl alcohol, or 2 ethyl hexanol.

11. The composition of claim 1 further comprising an amine.

12. The composition of claim 11 wherein the amine is an alkanolamine.

13. The composition of claim 1 further comprising at least one of a $C_{1-4}$ alcohol, propylene glycol ether, ethylene glycol ether, ethylene glycol n-butyl ether, propylene glycol n-propyl ether, isopropyl alcohol, triethylene glycol monobutyl ether, diethylene glycol n-butyl ether, propylene glycol methyl ether, propylene glycol n-propyl ether, furfuryl alcohol, tetrahydrofurfuryl alcohol, M-Pyrol, n-butyl alcohol, n-propyl alcohol, ethanol, methanol, iso-butyl alcohol, tert-butyl alcohol, sec. butyl alcohol, or acetone.

14. The composition of claim 1 further comprising a surfactant.

15. The composition of claim 1 further comprising a defoaming agent.

16. The composition of claim 1 wherein the water soluble alkoxylated aromatic alcohol having at least two oxyalkylene moieties per molecule is of the formula:

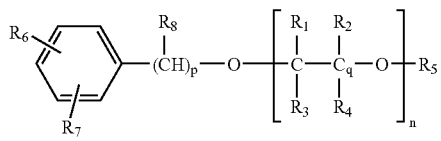

wherein:
$R_1$, $R_2$, $R_3$ and $R_4$ are independently hydrogen, methyl, or halogen;
$R_5$ is hydrogen;
$R_6$, $R_7$ and $R_8$ are independently hydrogen, halogen, or $C_{1-4}$ alkyl;
n is from about 2 to 10,
q is independently 1 or 2 for each of the n moieties, and
p is 0 or 1.

17. The composition of claim 16, wherein n is from about 2 to 7 and p is 1.

18. The composition of claim 17 wherein n is about 4.

19. The composition of claim 18 wherein the ratio of alkoxylated aromatic alcohol to polar solvent is from about 1:1 to about 10:1.

20. The composition of claim 18 wherein the ratio of alkoxylated aromatic alcohol to polar solvent is from about 1.4:1 to about 10:1.

21. The composition of claim 19 wherein the polar solvent is benzyl alcohol, ethylene glycol phenyl ether, or a combination thereof.

22. The composition of claim 21 further comprising an alkanolamine.

23. The composition of claim 1 wherein the polar solvent is benzyl alcohol and the composition further comprises a C2 to C4 aliphatic alcohol.

24. The composition comprising:
(i) about 1 to about 7% by weight of an alkoxylated aromatic alcohol having from 2 to 10 oxyalkylene moieties per molecule;
(ii) about 0.4 to about 5% by weight of a polar solvent having a water solubility of less than about 5% by weight in water at about 21° C.

25. The composition of claim 24, wherein the polar solvent has a water solubility of less than about 4% by weight in water at about 21° C.

26. The composition of claim 24 further comprising an alkaline source.

27. The composition of claim 24 comprising greater than about 80% water.

28. The composition of claim 1 comprising:
(i) about 10% to 99% by weight of an alkoxylated aromatic alcohol having from 2 to 10 oxyalkylene moieties per molecule;
(ii) about 5 to about 40% by weight of a polar solvent having a water solubility of less than about 4% by weight in water at about 21° C.;
(iii) about 0.01 to 5% by weight of an alkaline source;
(iv) about 0 to 85% water;
(v) about 0 to 2% by weight of a surfactant agent;
(vi) about 0 to 2% by weight of a defoaming agent; and
(vii) about 0 to 20% by weight of an auxiliary water soluble solvent.

29. The composition of claim 28 diluted to from about 2% to 25% volume in water.

30. The composition of claim 1 comprising:
(i) about 30 to about 50% by weight of an alkoxylated aromatic alcohol having an average of 4 oxyalkylene moieties per molecule;
(ii) about 25 to about 35% by weight of a polar solvent having a water solubility of less than about 4% by weight in water at about 21° C.;
(iii) about 0.01 to about 1% by weight of an alkaline source.

31. The composition of claim 30 diluted to from about 2% to 25% volume in water.

32. The composition of claim 1 comprising:
(i) about 43% by weight of an alkoxylated aromatic alcohol having an average of 4 oxyalkylene moieties per molecule;
(ii) about 25% by weight of the polar solvent having a water solubility of less than about 5% by weight in water at 21° C.
(iii) about 0.8% by weight of an alkaline source; and optionally about 0.2% by weight of surfactant.

33. The composition of claim 32 wherein the water soluble alkoxylated aromatic alcohol is of the formula:

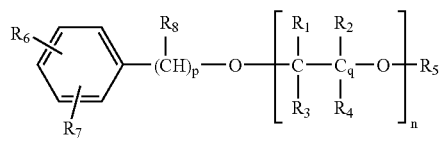

wherein:
$R_1$, $R_2$, $R_3$ and $R_4$ are independently hydrogen, methyl, or halogen;
$R_5$ is hydrogen;
$R_6$, $R_7$ and $R_8$ are independently hydrogen, halogen, or $C_{1-4}$ alkyl;
n is from about 2 to 10,
q is independently 1 or 2 for each of the n moieties, and
p is 1.

34. The composition of claim 33 diluted to from about 10 to about 12% volume in water.

35. The composition of claim 1 further comprising at least one of an alkaline source, a defoamer, a surface active agent or a corrosion inhibitor.

36. A method of removing water-based paint from a non-water-soluble surface comprising contacting said water-based paint with a composition comprising a water-soluble alkoxylated aromatic alcohol comprising at least two oxyalkylene moiety per molecule and an aromatic ring moiety in each molecule which does not bear any alkyl substituent having more than 4 carbon atoms and a polar solvent having a water solubility of less than about 5% by weight in water at 21° C.

37. The method of claim 36, wherein the polar solvent has a water solubility of less than about 4% by weight in water at 21° C.

38. The method of claim 36 wherein the water soluble alkoxylated aromatic alcohol is of the formula:

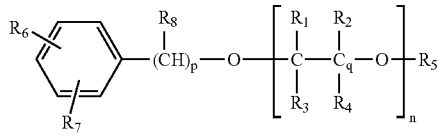

wherein:
  $R_1$, $R_2$, $R_3$ and $R_4$ are independently hydrogen, methyl, or halogen;
  $R_5$ is hydrogen;
  $R_6$, $R_7$ and $R_8$ are independently hydrogen, halogen, or $C_{1-4}$ alkyl;
  n is from about 2 to 10,
  q is independently 1 or 2 for each of the n moieties, and
  p is 0 or 1.

39. The method of claim 36 wherein the composition is applied to the paint by spraying.

40. The method of claim 36 wherein the non-water-soluble surface is a surface of a component of a coating application equipment and said contacting is accomplished by circulating the composition through said component.

41. The method of claim 40 wherein said coating application equipment is paint spraying equipment.

42. The method of claim 41 wherein the diluted solution passing through the coating application equipment is at a temperature of from about 16° C. to about 32° C.

43. The composition of claim 1 wherein the water soluble alkoxylated aromatic alcohol having at least two oxyalkylene moieties per molecule is of the formula:

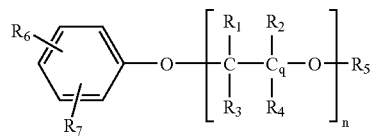

wherein:
  $R_1$, $R_2$, $R_3$ and $R_4$ are independently hydrogen, methyl, or halogen;
  $R_5$ is hydrogen;
  $R_6$, $R_7$ and $R_8$ are independently hydrogen, halogen, or $C_{1-4}$ alkyl;
  n is from about 2 to 10, and
  q is independently 1 or 2 for each of the n moieties.

44. The composition of claim 1 having a lbs/gal volatile organic compound level of less than 3 lbs/gal when in concentrate form.

45. The method of claim 36 wherein the wherein the weight percent concentration of the alkoxylated aromatic alcohol in the composition is equal to or greater than the weight percent concentration of the polar solvent.

46. The method of claim 36 wherein the weight percent concentration of the alkoxylated aromatic alcohol in the composition is greater than the weight percent concentration of the polar solvent.

47. The method of claim 36 wherein the composition comprises:
  (i) about 1 to about 7% by weight of a water-soluble alkoxylated aromatic alcohol having from 2 to 10 oxyalkylene moieties per molecule;
  (ii) about 0.4 to about 5% by weight of a polar solvent having a water solubility of less than about 5% by weight in water at about 21° C.

48. The method of claim 1 wherein the composition has a lbs/gal volatile organic compound level of less than 3 lbs/gal when in concentrate form.

* * * * *

UNITED STATES PATENT AND TRADEMARK OFFICE
CERTIFICATE OF CORRECTION

PATENT NO. : 7,482,316 B2  Page 1 of 1
APPLICATION NO. : 10/871258
DATED : January 27, 2009
INVENTOR(S) : Wilson et al.

It is certified that error appears in the above-identified patent and that said Letters Patent is hereby corrected as shown below:

COL. 33, line 45 (claim 24), delete "The" and substitute therefor --A--; line 46, delete "an alkoxylated" and substitute therefor --a water-soluble alkoxylated--

COL. 35, line 35 (claim 42), delete "diluted solution" and substitute therefor --composition--

COL. 36, line 20 (claim 45), delete first occurrence of "wherein the"

Signed and Sealed this

Twenty-fourth Day of March, 2009

JOHN DOLL
*Acting Director of the United States Patent and Trademark Office*